March 17, 1959     F. ELENCIK     2,877,596
GAME TRAP
Filed March 6, 1956
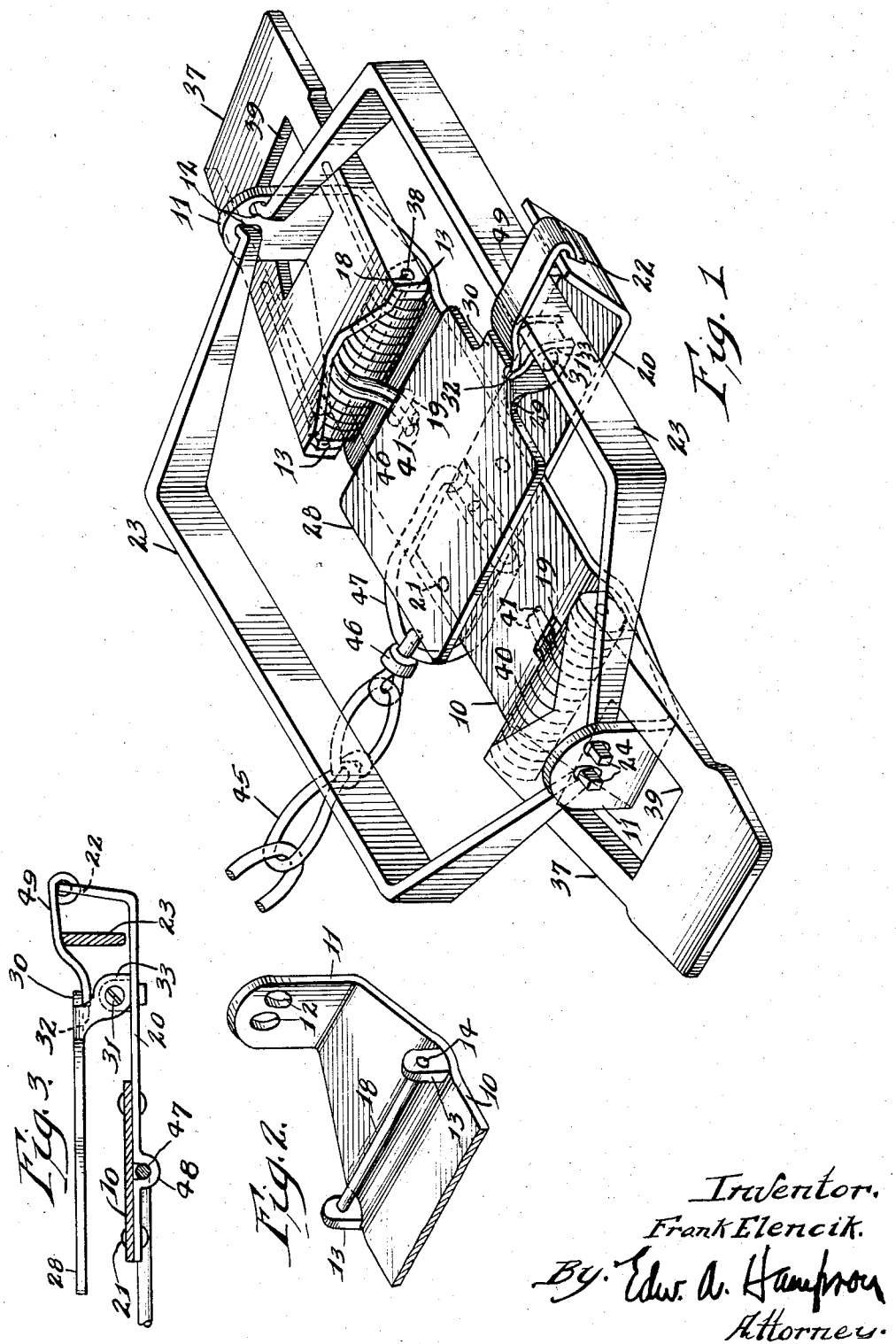
Inventor.
Frank Elencik.
By: Edw. A. Hampson
Attorney.

United States Patent Office 2,877,596
Patented Mar. 17, 1959

2,877,596

GAME TRAP

Frank Elencik, Trucksville, Pa.

Application March 6, 1956, Serial No. 569,807

1 Claim. (Cl. 43—88)

The invention resides in a new and novel game trap, which more particularly is of the spring actuated jaw classification.

Such traps are employed substantially entirely in catching fur bearing animals and are usually set on the ground so located that the animal to be caught is liable to step on the trap release mechanism. Sometimes this type of trap is set under water and at times even in trees. Such a trap may be baited by a substance placed in the trap pan, the initial trap release mechanism, or set without bait in a runway, more or less covered by a light layer of dirt, grass, or twigs.

In any case the objective is that the animal shall inadvertently step on the initial trap release mechanism, usually referred to as the pan or trigger, or that in investigating or reaching for bait placed on the pan, shall thereby actuate the pan.

It is accordingly obvious that it is desired that the animal enter its leg well into the trap and that the trap jaws shall close high up on the leg without necessitating the use of large wide jaws for securing a high and firm grip on the leg member.

Traps of the type referred to are usually secured by an attached chain which is attached to a pin driven into the ground or the like. To prevent a caught animal from breaking its leg through exerting a cross or angular pull against the restraining effect of the chain anchorage, the chain, according to the invention hereof, is attached to the trap in a particular position and manner as will be hereinafter fully described.

The principal objectives of this invention are the provision of a spring-actuated, jaw-type trap of such construction that, by a particularly low placement of the pan or trigger, a smaller trap may have the effectiveness of a larger trap of the usual construction, the trap when set is very flat and compact and easy to set and conceal, and through placement and construction of its chain attachments, provides for a straight pull against the chain anchorage. Further and other objectives of the inventions hereof will be apparent on reading the following description.

The preferred exemplification of the inventions hereof are illustrated in the accompanying drawings in which—

Figure 1 is a perspective view of the trap in set position;

Figure 2 is a detail perspective illustrating a portion of the trap frame; and

Figure 3 is a detail elevation partly in section illustrating the connection of the anchor chain.

In the drawings the trap is illustrated as having a base plate 10 which is a relatively long and narrow metal strip which, at each end, has a portion 11 turned upwardly at a right angle and which portions 11 comprise upstanding ears. Each ear 11 has two openings or perforations 12 which are slightly spaced and in which the jaws are pivoted.

On base plate 10, toward each outer end but spaced somewhat inwardly from ears 11, there are provided at the opposite edges of the base strip 10, upstanding members 13, each of which is provided with a perforation 14 to receive and mount spring mounting pin 18.

Spaced somewhat further inwardly from upstanding members 13, base member 10, symmetrically positioned, is provided with substantially centrally positioned perforations 19 shown as somewhat eliptical or elongated across the width of the base member for receiving the ends of spring members which will be more fully described.

Cross member 20, a metal strip, is suitably secured at its inner end to base plate 10 by rivets 21, spot welding, or the like. At its outer end, member 20 is turned upwardly and close to its end is pierced by a slot 22.

A pair of jaws 23—23 are mounted to base plate 10. The end portions of jaw members 23 narrow down and are turned outwardly forming pintle portions 24 which enter perforations 12 of ear members 11, whereby jaws 23 are pivoted to the base plate.

A pan or trigger 28 at its outer end is provided with downturned ear portions 29 perforated to receive a mounting pivot 31. Pan 28 is pivotally mounted in a U-shape member 33 which is secured by rivet, welding, or the like, to cross member 20, and has opposed perforations in its legs to receive pivot 31 above referred to. A narrow portion of pan 28 extends beyond the downturned ears 29 to comprise trip finger 30.

Completing the general assembly to the trap, there are provided at each end of base plate 10, pivoted lever members 37 which are generally of rectangular shape. The opposite side edges of each lever member 37 are turned down as flanges, perforated at 38 to receive the ends of pin 18 previously referred to.

Each lever member 37 is provided with a rectangular cut-out 39.

The lever members 37 are pivotally mounted adjacent the ends of base plate 10 on pins 18 entered through perforations 38 in the side flanges of the levers 37 and perforations 14 of upstanding members 13.

Springs 40 are also mounted on pins 18. These are spirally wound springs with extending end portions at each end of each spring. At one end, these spring ends, as at 41, are entered into elongated perforations 19 in base plate 10. The other extending ends of the springs extend out under lever members 37. It is understood, of course, that these springs are so positioned, as is well understood, that the lever members are biased upwardly about their pivot points.

Latch lever 49, which retains the trap in set position, is a strip form member looped at its outer end through slot 22 of cross member 20 so as to be pivotally mounted. The inner end of latch lever 49 enters into recess 32 under trip finger 30. It will be readily seen that when the trap is set the latch lever 49 extends across and holds down a jaw 23 to be in turn held down by trip finger 30. The length of latch lever 49 is such that it is retained under trip finger 30 when the pan 28 is horizontal but will be released when pan 28 is depressed, pivoting pan 28 and releasing latch 49 by withdrawal of trip finger 30.

Release of latch 49 allows it to pivot and release the jaw which was held down by the latch. The jaws no longer being restrained, lever member springs 40 cause levers 37 to pivot, whereupon the side edges of cut-outs 39 force the jaws to pivot and come together or to grip the leg of an animal which may have stepped on the pan and thus tripped the trap.

Briefly the trap may be set as follows: Levers 37 are pressed downwardly against the torsion springs 40. This allows jaws 23 to drop downward whereupon latch lever 49 is flipped over the jaw with its outer end secured by lifting of pan 28 to position trip finger 30 over the end of the latch lever and thereby secure the trap in open or set position.

To provide for anchoring the trap chain 45 is provided. Chain 45 is attached to a swivel 46 mounted to a loop member 47 pivotally mounted through a tunnel or recess formed by a deformation or bumped portion 48 in the inner end of cross member 20.

From the foregoing it should be obvious that the described construction affords a most compact trap. The pan or treadle is positioned low so that when the trap is set it is definitely below the level of the jaws. This assures an animal's foot will be well entered inside the trap before it is sprung so that the trap will take a high hold without the necessity of the use of wide jaws to accomplish such result. The compact and flat construction as described also results in a trap which is easy to set and conceal. Also due to what may be termed the universal connection of the anchoring chain, it is obvious that regardless of the direction of pull on the trap, by a caught animal, it will be a straight line pull against the trap anchor.

I claim:

A game trap comprising in combination a base plate, a cross base plate secured at an end to the base plate substantially mid-way of the length thereof, the end portions of the base plate being turned upwardly, said turned up end portions being perforated, a pair of substantially U-shaped jaw members having the end portions thereof turned outwardly to provide pintle portions, the said pintle portions of the jaw members being pivotally mounted in the perforations in the upturned end portions of the base plate, spring actuated levers pivoted adjacent the ends of the base plate, said levers having cut out portions intermediate their ends embracing the upturned ends of the base plate and portions in contact with said jaws for biasing the same from an open to a closed position, the outer end of said cross base plate being upturned, a keeper member pivotally mounted adjacent the outer end of the cross base plate on the upturned end thereof, a combination pan and latch member pivotally mounted to the cross base member intermediate the ends of the cross base member, said combination member to one side of its pivotal connection comprising a latch portion and to the opposite side of its pivotal connection comprising a pan portion, said cross base plate having a channel-shaped recess formed therein adjacent its secured end and midway of the width of the base plate, a substantially D-shaped connector having the straight leg thereof received in the channel-shaped recess of the cross base plate pivotally retained therein by the base plate and a trap securing chain connected to the D-shaped connector.

References Cited in the file of this patent

UNITED STATES PATENTS

| | | |
|---|---|---|
| 786,145 | Parsons | Mar. 28, 1905 |
| 1,465,528 | Rufty | Aug. 21, 1923 |
| 1,960,122 | Pitre et al. | May 22, 1934 |
| 2,149,996 | Gulden | Mar. 7, 1939 |
| 2,247,632 | Graybill | July 1, 1941 |
| 2,562,308 | Franchok et al. | July 31, 1951 |